United States Patent
Noel et al.

[15] 3,704,735
[45] Dec. 5, 1972

[54] AUTOMATIC SPLITTING MACHINE FOR HAND-OPENED MUFFINS

[72] Inventors: Eugene M. Noel, Newton Highlands; Frank Conelly, Plymouth, both of Mass.

[73] Assignee: Said Noel by said Conelly, a part interest

[22] Filed: Feb. 22, 1971

[21] Appl. No.: 117,333

[52] U.S. Cl. .............................83/2, 99/485, 83/734
[51] Int. Cl. ...............................................B26d 3/08
[58] Field of Search.........................................146/72

[56] References Cited

UNITED STATES PATENTS 3,192,975   7/1965   Noel....................................146/72

Primary Examiner—Willie G. Abercrombie
Attorney—Rummler & Snow

[57] ABSTRACT

An automatic muffin-splitting machine of increased productivity having a traveling conveyor belt for intermittently delivering muffins to a tining section to be tined and split, said tining section having first and second pluralities of tines operating from respective opposite sides of the conveyor belt, said pluralities of tines traversing the belt in simultaneous reciprocal interdigitating cooperation from the opposite sides thereof, said first plurality of tines being automatically lifted out of the plane of interdigitation with the second plurality of tines as full penetration of the tines into the muffins is reached, and said intermittent tining of said muffins being coordinated with movement of the traveling belt by cam-actuated, pilot-operated, air cylinder-powered, over-center link and lever mechanism; whereby the machine automatically produces muffins properly perforated and split, but not fully separated, for gentle hand opening whenever desired in preparation for grilling or toasting.

4 Claims, 6 Drawing Figures

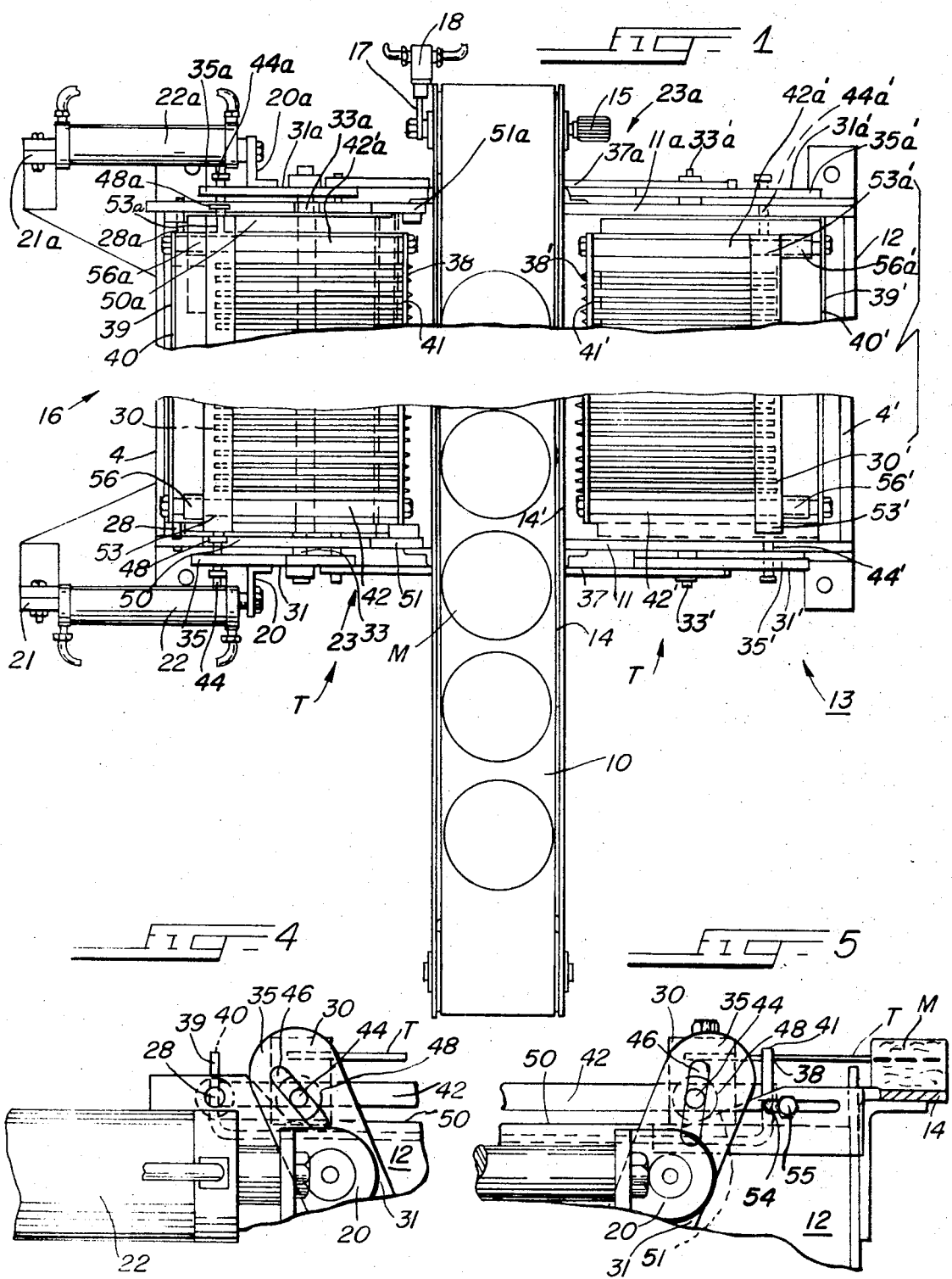

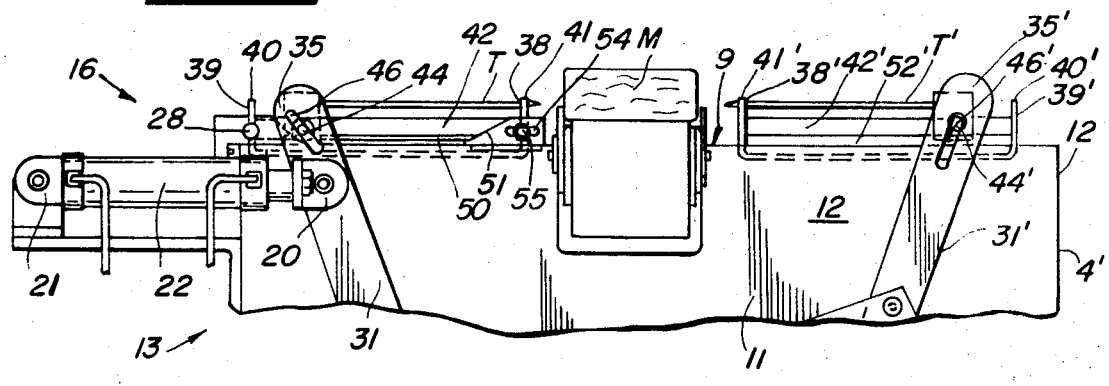
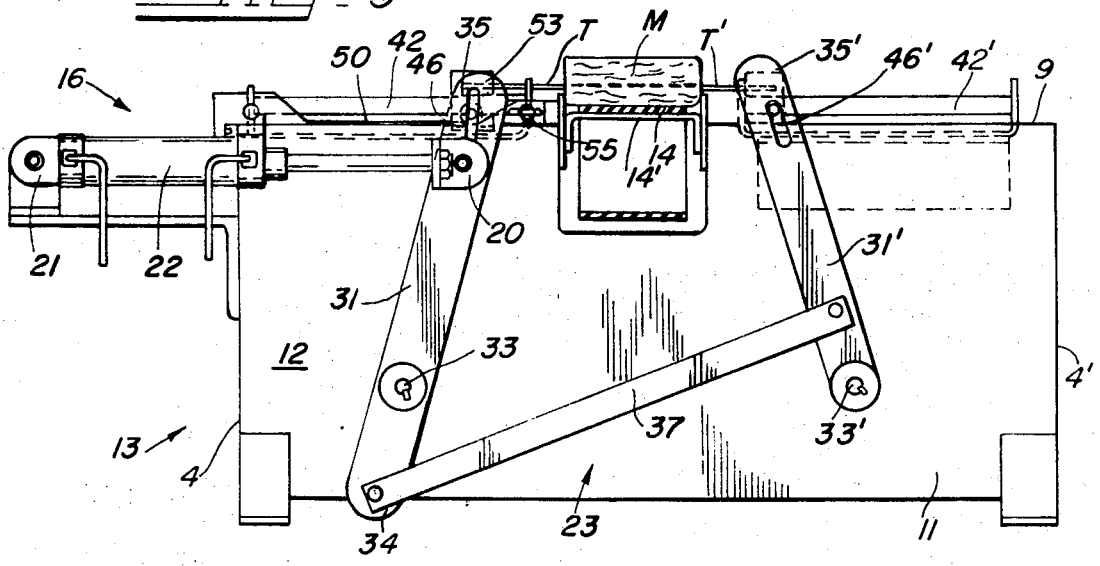
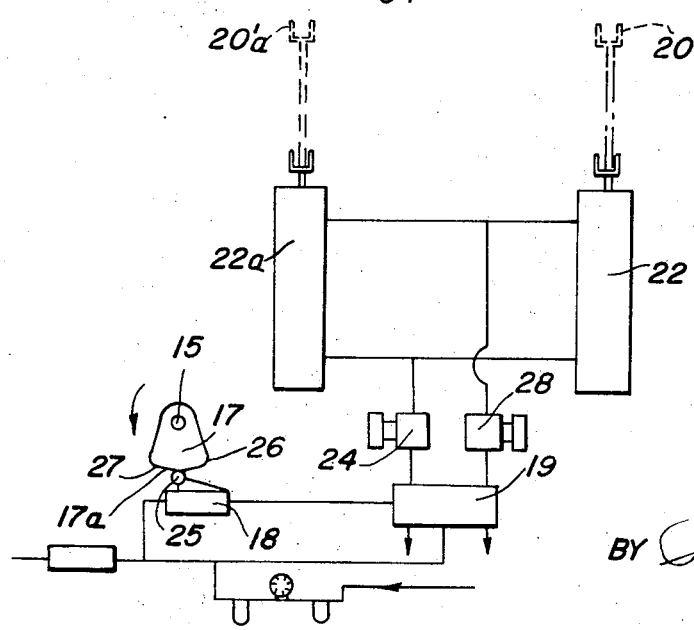
INVENTORS.
EUGENE M. NOEL
FRANK CONNELLY

AUTOMATIC SPLITTING MACHINE FOR HAND-OPENED MUFFINS

BACKGROUND OF THE INVENTION

This invention relates to a high-productivity, air cylinder-powered muffin-splitting machine suitable for the intermediate sized muffin manufacturer or distributor who serves that discriminating muffin market which demands a muffin which can be gently opened by hand at the time of consumption in preparation for grilling and toasting.

A muffin properly perforated and split for hand opening allows the users to gently open the muffin into two rough surface halves of equal thickness by hand. This is not possible with the non-split muffin. The rough surface of the muffin allows the high portions to carmelize or carbonize earlier and drives the heat of the toasting application into the pores and holes of the muffin, making the product taste better. A sliced or cut muffin has smeared gluten on its surfaces which glazes over and is gummy underneath and does not taste as well as a properly-split muffin. A muffin properly perforated and split for hand opening has the same shelf life as a non-split muffin whereas a pre-sliced or cut muffin stales in the stores and becomes concave when it dries out, which shape is accentuated when toasted. Muffins which are properly split provide that rough "-crumbly" surface which, when heated, absorbs melted butter in a superior manner, as contrasted to the glaze on a smooth cut surface, resulting in a superior food product for the discriminating market.

Since the issue of U.S. Pat. No. 3,192,975 on July 6, 1965, covering a fully-automatic, high-rate, muffin-splitting machine, the market for such special-purpose equipment has broadened to include a demand for a low-cost, automatic muffin splitter having a muffin production rate of around 80 muffins per minute.

The prior art in the case of muffin splitting goes back to the Schneider Food Breaker U.S. Pat. No. 1,858,790, issued May 17, 1932, which discloses a plurality of tines arranged so that the food will present substantially no resistance to the insertion of the tines and yet are so related in position to each other as to resist movement of the foot between the tines when said tines are moved angularly with respect to, or away from, the main body of the food. This device is a simple, hand-operated, one-at-a-time splitter which has very low muffin-splitting rate capability.

The Jovis Muffin Tearing U.S. Pat. No. 2,840,129, issued June 24, 1958, teaches a simple one-at-a-time splitter and not a machine of the productive capacity required by industry.

A Swedish Pat. No. 145,284 to Nilsson on a Muffin Splitter, issued Mar. 18, 1954, discloses a semi-automatic, hand-fed machine for splitting muffins. The muffins are hand fed onto a flat plate in front of a sliding frame with pointed flat knives which automatically push the muffins onto an opposing set of stationary flat knives and the cut is completed all the way through as though made by a single guillotine blade. The stationary set of knives is hinged and automatically actuated to lift the top half of the muffin off the bottom half to consummate the cut. The two halves are then dumped onto a conveyor, leaving the plate ready for the next hand feeding. The Swedish patent discloses a machine which is to be distinguished from the machine of this invention as to means of operation and surface texture of the muffin split.

SUMMARY OF THE INVENTION

The gist of this invention lies in the use of a continuously-traveling conveyor belt carrying muffins in intermittent delivery to a tining section, said tining section having a first plurality of tines on a first side of the conveyor belt and a second plurality of tines on a second side of the conveyor belt, and said first and second pluralities of tines being intermittently interdigitated in their reciprocal traverse of said conveyor belt by the operation of an air cylinder-powered, over-center link and lever mechanism, cam actuated in the proper phase relationship with respect to said belt travel. An automatic lifting of the first plurality of tines from the plane of the second plurality of tines, upon completion of the full penetration of the tines through the muffins, partially tears or splits the muffins without separating the halves, rendering subsequent hand opening easy.

The mechanism according to the present invention comprehends the movement of the muffins along a conveyor belt where they are perforated from opposite sides by pluralities of interdigitating tines supported for movement transverse to the conveyor belt. The pluralities of tines enter the muffins in a transverse perforating and penetrating operation and they retract therefrom to provide the muffin with a multiplicity of closely-spaced holes or perforations which enables it to be torn apart by hand along what may be likened to a weakened cleavage plane. The resultant muffin halves, instead of having smooth surfaces, which would result from the usual knife or saw blade-cutting operation, have open texture and somewhat roughened surfaces, which make the muffin halves more desirable for toasting and grilling. Also, with the present mechanism, the muffins are more uniformly divided so that the resulting halves are of substantially equal thickness to facilitate mechanical toasting or grilling procedures.

In another embodiment of the invention, the muffins are not only perforated by the tines, but one of the plurality of interdigitating tines is lifted out of the plane of the other plurality of tines only enough to effect an incomplete separation of the two halves of the split muffin. This serves to provide a muffin which the user can gently open into two rough surface halves by hand.

With the foregoing considerations in mind, it is a principal object of the invention to provide a low-cost, automatic, muffin splitting machine for producing muffins which the user can gently open into two rough surface halves of even size at a production rate in excess of 80 muffins per minute.

Another object of this invention is to provide a low-cost, automatic muffin-splitting machine having adjustment of the split for producing a muffin which can be hand opened with a gentleness of effort satisfying the most discriminating muffin consumer.

Other objects and important features of the invention will be apparent from a study of the following specification taken with the drawings, which together describe and illustrate a specific embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

DESCRIPTION OF THE DRAWINGS

In order to demonstrate the invention, reference is made to the specific embodiment illustrated by the drawings, in which reference numbers which are unprimed refer to elements of the invention which are disclosed and reference numbers which are primed refer to corresponding elements which may not be disclosed but are inherent to the invention.

FIG. 1 is a plan view of the automatic muffin-splitting machine showing the horizontal relationship of the conveyor belt traveling from one end of the frame of the machine to the other; the first and second tine sections on the first side and the side opposite the belt and the muffins thereon; and the cam-actuated, pilot valve-operated, air cylinder-powered lever and over-center link mechanism for actuating the tining and splitting of the muffins thereon;

FIG. 2 is a fragmentary elevational view of the same showing the vertical relationship of the muffins on the conveyor belt traveling on the top of the frame of the machine and the first and second tine sections in position for beginning the simultaneous reciprocal perforating and tining of the muffins thereon;

FIG. 3 is an elevational view of the cam-actuated, pilot valve-operated, air cylinder-powered lever and over-center link mechanism of the machine with the mechanism shown in operated position for effecting simultaneous reciprocal tining and splitting of the muffin;

FIG. 4 is a fragmentary elevational view of the machine showing the rod end of the air cylinder connected to the lever carrying the first tine bar, the parts being shown with the tines in withdrawn position;

FIG. 5 is a fragmentary elevational view of the machine showing the cam roller on the first tine bar engaging the cam ramp mounted on the frame for lifting the tines of the first tine bar out of the plane of interdigitation with the tines of the second tine bar for effecting a split of the muffins; and FIG. 6 is a schematic of the cam-actuated, pilot valve-operated, air cylinder-powered pneumatic circuit for coordinating the phase relationship of the tining of the muffins with the traveling of the muffins on the conveyor belt of the machine.

DESCRIPTION OF THE PREFERRED EMBODIMENT

Plan and end views of the automatic muffin-splitting machine 13 having a muffin-splitting section 16 with ends 11 and 11a are shown in FIGS. 1 through 3 wherein frame 12 mounts traveling muffin belt 14 for carrying muffins M disposed on conveyor track 14' extending between first and second tine sections T and T' operationally mounted above top 9 of frame 12.

Frame 12 has a first side 4, a second side 4', a first end 11 and a second end 11a. First tine section T, comprised of a plurality of tines of triangular cross-section mounted base side up, is slidably mounted on a first channel 39 having front leg 41 parallel and adjacent to conveyor track 14' and a back leg 40 parallel and adjacent to first side 4 of frame 12. Front leg 41 of first channel 39 has a plurality of piloting holes 38 extending along its length for piloting the plurality of tining ends of tine section T in the plane of the tining of muffins M from the first side thereof. Back leg 40 of channel 39 is pivotally mounted to first side 4 of frame 12 at pivots 28 and 28a adjacent machine ends 11 and 11a, respectively, as shown in FIG. 4, so that as front leg 41 of channel 39 is lifted as in FIG. 5, tine section T pivotally rotates about said pivots 28 and 28a lifting the tines of section T above the plane of tining of muffins M.

First tine section T is supported at the back ends of the tines of section T in FIG. 1 by tine bar 30 running the full length of the tine section. Tine bar 30 is mounted at its ends 53 and 53a on bushings 56 and 56a which slidably run on guide rods 42 and 42a as first tine section T moves in for penetration of and moves out for withdrawal from the first side of muffins M in the tining thereof. Guide rods 42 and 42a are mounted at the respective ends of channel 39 to tie front leg 41 to back leg 40 to complete the structural unity of the tine section thereof.

Tine bar 30 has pins 44 and 44a extending from ends 53 and 53a, respectively, thereof, as shown in FIGS. 1 and 4. Pins 44 and 44a rotatably carry cam rollers 48 and 48a, respectively. Cam rollers 48 and 48a run on cam races 50 and 50a which are flat at the start of penetration of the tines into the muffins, as shown in FIG. 4. Subsequently, as tining of the muffins progresses, rollers 48 and 48a run up on cam ramps 51 and 51a, respectively, as shown in FIG. 5, lifting tine section T, as it moves in penetration of muffins M above the plane of tining, separating the top half of said muffins off the bottom half, which is being held on conveyor belt 14 by tine section T', effecting a split of muffins M thereof. Cam races 50 and 50a are mounted on top 9 along and at ends 11 and 11a of frame 12 adjacent the ends of tine sections T with ramps 51 and 51a located adjacent to conveyor track 14'.

The split of muffins M is made adjustable by slidably moving cam races 50 and 50a with attached ramps 51 and 51a closer to or away from conveyor track 14' on slots 54 and 54a (not shown), as shown in FIG. 5, and securing the same for any one setting of the muffin split by bolts 55 and 55a (not shown). To increase the split, ramps 51 and 51a are set farther away from conveyor track 14'.

Tine bar 30' of second tine section T', comprised of a plurality of tines of triangular cross-section mounted base side down, opposite of and adjacent to the second side of the muffins, slidably acts in the exact reverse to the slidable movement of first tine section T when moving in for penetration of and moving out for withdrawal from the second side of muffins M in the tining thereof. However, for the purpose of effecting a split of muffins M, there is no cam race and ramp mounted to frame 12, nor cam follower on tine bar 30', to lift the front leg 41' of channel 39' relative to back leg 40'. Second tine section T' slidably tines muffins M from the second side thereof in the plane of tining and as full penetration of the muffins is reached, holds the bottom half of said muffins on the belt 14 while the top half is lifted above the plane of tining by tine section T, effecting the split thereby.

First tine section T is made to move simultaneously in reciprocal cooperation with respect to second tine section T' so that muffins M are tined from the first side of the muffin at the same time they are tined from the second side by the action of overcenter link mechanisms 23 and 23a.

With tines withdrawn from the muffins M, tine section T and tine section T' lie in the same plane of tining. With tines penetrating muffins M, the tines of tine section T lie in a laterally-offset interdigitating relation with respect to the tines of section T' so that during the tining of muffins simultaneous from both sides there is no interference between tines of sections T and T' though they lie in the same plane.

In the tining of muffins M from the first side thereof, the first tine section T is actuated in the traverse of conveyor track 14' by slots 46 and 46a (not shown) in first levers 31 and 31a, as shown in FIG. 3, which are slidably engaged by pin extensions 44 and 44a on tine bar 30. First levers 31 and 31a are pivotally mounted to ends 11 and 11a of frame 12 at pivots 33 and 33a, respectively. Pivots 33 and 33a are located below top 9 intermediate first side 4 and conveyor track 14' on frame 12.

In the tining of muffins M from the second side thereof, the second tine section T' is actuated in the traverse of conveyor track 14' by slots 46' and 46a' (not shown) in second levers 31' and 31a', as shown in FIG. 3, which are also slidably engaged by pin extensions 44' and 44a' in tine bar 30'. Second levers 31' and 31a' are again pivotally mounted to ends 11 and 11a, respectively. Pivots 33' and 33a' are again located below top 9 intermediate second side 4' and conveyor track 14' on frame 12.

In the functioning of link-lever mechanism 23—23a after the charge of muffins to tining section 16 is complete, first tine section T is actuated by first levers 31—31a acting on tine bar 30 carrying the tines to penetrate muffins M from first side thereof. As shown in FIG. 3, levers 31—31a are in turn actuated by extension of rod ends 20—20a relative to trunions 21—21a of air cylinders 22—22a. Simultaneously, second levers 31'—31bj: cooperate through over-center links 37—37a to carry tine bar 31' in reciprocal cooperation with respect to tine bar 30 causing second tine section T' to penetrate muffins M from the side opposite. First levers 31 and 31a are pivotally mounted intermediate lower lever ends 34—34a and upper lever ends 35—35a at pivots 33—33a mounted to the first side of conveyor belt 14 on opposite ends 11—11a below top 9 of frame 12. Second levers 31'—31a' are pivotally mounted to the side opposite of conveyor belt 14 at lower lever ends 33'—33a' on opposite ends 11—11' below top 9 of frame 12. Over-center links 37—37a are pivotally connected to the lower lever ends 34—34a of first levers 31 and 31a and are pivotally connected to second levers 31'—31a' intermediate of lower lever ends 33'—33a' and upper lever ends 35'—35a'.

As first and second tine sections T—T' penetrate muffins M from opposite sides, said tines are piloted in holes 38—38' in channels 39—39' shown in FIG. 2, respectively. Opposite legs 40—41 and 40'—41' of channels 39 and 39', respectively, are tied together by guide rods 42—42a and 42'—42a'. Tine bars 30 and 30' having holes at each end are slidably mounted on guide rods 42—42a and 42'—42a' to carry first and second tine sections T—T', respectively. The first tine section T is secured to tine bar 30. The second tine section T' is secured to tine bar 30'.

Pins 44—44a and 44'—44a' in ends 53—53a and 53'—53a' of tine bars 30—30', respectively, as shown in FIGS. 2 and 3, are slidably engaged in slots 46—46a in levers 31 and 31a and in slots 46'—46a' in levers 31'—31a', respectively. As explained before, levers 31—31a are actuated by air cylinders 22 and 22a' as supplied with air from shuttle valve 19 under the direction of pilot valve 18, extending rod ends 20—20a and effecting the penetration of muffins M.

In the operation of the muffin-splitting machine of this invention for maximum productivity, muffins M are fed to input station 10 shown in FIG. 1 from the output of prior muffin processing machinery. Traveling conveyor belt 14 traverses input station 10 to which muffins M are fed for carriage to tining and splitting section 16. Conveyor belt 14 carrying muffins M travels at a constand speed driven by drive shaft 15. Drive shaft 15 is in turn driven by a suitable prime mover with appropriate speed reduction. Muffins M are tined and split in groups and the speed of belt 14 is adjusted to match the maximum feed-rate capability of the machine.

As the muffins M are fed to station 10, tines T—T' of machine 13 are in the withdrawn position, as shown in FIG. 1. The first of the muffins of the group to be fed travels down belt 14 between tines T—T'. Second muffin M does likewise, as does the third, and so on in close succession thereof until the full charge of muffins in tining section 16 is complete. At the time said first muffin M of the group arrives between tines T—T' adjacent to the end of section 16 and the charge to the tining section 16 is complete, cam 17 actuates pilot valve 18 as shown in FIG. 6. Pilot valve 18 then throws shuttle valve 19 to energize air cylinders 22—22a so as to extend the rod ends 20—20a from trunion ends 21—21a causing tines T-T' to traverse conveyor belt 14 in simultaneous reciprocal relation thereto, perforating and penetrating muffins M therethrough from opposite sides thereof. Simultaneous reciprocal tining by tines T and T' is achieved by the action of lever and overcenter link mechanisms 23—23a mounted on opposite ends 11—11a of frame 12 of machine 13, as will be discussed later in detail. The time required for tines T—T' to penetrate through the muffins M is regulated by the setting of the rate of flow of air to cylinders 22—22a by means of flow control valve 24 shown in FIG. 6.

The time for starting of penetration of muffins M by tines T—T' in the traverse of conveyor belt 14 is fixed by the position of cam lobe 26 on the running face 17a of cam 17. As cam lobe 26 lifts cam follower 25 energizing air cylinders 22—22a, the penetration of muffins M by the tine sections T—T' starts. The dwell period of cam 17 or the time it takes from start of penetration to start of withdrawal of tines T—T' is fixed by the angular distance between cam lobe 26 and cam lobe 27 on the face 17a of cam 17 as it rotates. As cam follower 25 subsequently contacts cam lobe 27, pilot valve 18 is deactuated throwing shuttle valve 19 to reverse the flow of air to cylinders 22—22a so as to retract rod ends 20—20a from trunion ends 21—21a causing tines T—T' to withdraw from muffins M. The time required to withdraw tines T—T' from muffins M is regulated by flow control valve 28 shown in FIG. 6.

During the time of tining and splitting of muffins M, including the withdrawal of tines T—T' therefrom, all muffins M in tining section 16 are held stationary by the penetration of the tines therethrough. During this time, traveling belt 14 continues to slide at constant speed under muffins M. The speed of belt 14 is such that the time elapsed between the full withdrawal of the tines from the muffin M and the start of penetration thereof is just equal to the time for the tining section 16 to receive its full charge of muffins M. Thus the speed of belt 14 and the time for the tining cycle are coordinated by means of cam 17. The muffin acceptance rate of machine 13 can be increased by increasing the speed of drive shaft 15 with a change in the speed reduction attached to the prime mover. However, the time for tining the muffins and withdrawal therefrom must be correspondingly reduced by suitable change in the setting of flow control valves 24 and 28 regulating the flow of air to cylinders 22—22a if the proper coordination of tining and belt travel is to be maintained.

As the first and second pluralities of tines T—T' are withdrawn from muffins M, tine sections 30—30' slidably move on guide rods 42—42a and 42'—42a' in the reverse direction thereto simultaneously withdrawing said tines T—T' from said muffins in reciprocal cooperation therefrom. Again, as explained before, air supply in the reverse direction by action of pilot valve 18 on shuttle valve 19 causes retraction of rod ends 20—20a to effect the withdrawal of first and second tine sections T—T' from muffins M. In the withdrawal of tines T—T' from muffin M, link-lever mechanism 23—23a acts in the exact reverse manner as heretofore described during penetration.

Although but one specific embodiment of this invention has been herein shown and described, it will be understood that the details of construction shown may be altered or omitted without departing from the spirit of the invention as defined in the appended claims.

We claim:

1. An automatic muffin-splitting machine having a conveyor belt for carrying muffins thereon comprising:
   a. a frame having a top and first and second ends and said conveyor belt traveling on top of said frame from over said first end to over said second end;
   b. a first tine section mounted at one side of the conveyor belt in parallel relation therewith and having a length equal to a predetermined number of muffin diameters, said tine section comprising a plurality of parallel laterally-spaced tines projecting toward the belt, and said tine section being supported on fixed guide means mounted on said frame for reciprocal movement of said tines in parallel transverse planes over the conveyor belt;
   c. a second tine section similar to the first tine section and similarly mounted on the other side of the conveyor belt for reciprocal movement of its tines in parallel planes over the conveyor belt, said second section tines being spaced for interdigitating relation with the tines of the first section;
   d. means for operating said first and second tine sections for intermittent traverse of the conveyor belt in simultaneous reciprocal cooperation with each other;
   e. means for coordinating the operation of the first and second tine sections with the conveyor belt travel; and
   f. means for lifting one tine section out of the plane of interdigitation with the other tine section while the muffins are penetrated by the tines.

2. An automatic, muffin-splitting machine as disclosed in claim 1 wherein the means for operating said first tine section in the intermittent traverse of the conveyor in simultaneous reciprocal cooperation with said second tine section comprises:
   a. first levers having lower and upper ends and pivotally mounted therebetween on the first and second ends and below the top of the frame on the said one side of the conveyor;
   b. said first levers having slots at their upper ends operationally engaging pins on first and second ends of a first tine bar carrying said first tine section;
   c. said first levers pivotally carrying at their lower end first ends of over-center links;
   d. second levers having lower and upper ends, said lower ends pivotally mounted on the first and second ends of the frame below the top and to the said other side of the conveyor;
   e. said second levers having slots at their upper ends operationally engaging pins on first and second ends of a second tine bar carrying said second tine section;
   f. said second levers pivotally carrying second ends of over-center links intermediate their upper and lower ends;
   g. said first levers pivotally mounting rod ends of air cylinders; and
   h. the other ends of said air cylinders being pivotally mounted on said frame.

3. An automatic, muffin-splitting machine as disclosed in claim 1 wherein the means for coordinating the traverse of the conveyor by the first and second sections of tines with the conveyor belt travel comprises:
   a. a cam mounted on and constrained to rotate in a phased relationship with respect to a shaft for driving said traveling conveyor belt; and
   b. a pilot means mounted on said frame having a cam follower engaging said cam for actuating a shuttle air valve and directing air to extend and retract the rods of said air cylinders in the timing of said muffins in a phased relationship with respect to the traveling conveyor belt.

4. An automatic, muffin-splitting machine as disclosed in claim 3 wherein the pilot means comprises a normally-closed air valve.

* * * * *